US008945286B2

(12) United States Patent
Schulze et al.

(10) Patent No.: US 8,945,286 B2
(45) Date of Patent: Feb. 3, 2015

(54) DEVICE AND METHOD FOR TREATING A HOT GAS FLOW CONTAINING SLAG

(75) Inventors: Olaf Schulze, Halsbrücke (DE);
Dietmar Rüger, Goppeln (DE); Anton Althapp, Oberschöna (DE); Michael Gätke, Freiberg (DE); Burkhard Möller, Kleinwaltersdorf (DE); Reinhold Grunwald, Hoyerswerda (DE); Ralf Grunwald, legal representative, OT Neue Mühle (DE); Michael Grunwald, legal representative, Hamburg (DE); Monika Grunwald, legal representative, Hoyerswerda (DE)

(73) Assignee: CCG Energy Technology Company Ltd., Tsimshatsui, Kowloon (CN)

( * ) Notice: Subject to any disclaimer, the term of this patent is extended or adjusted under 35 U.S.C. 154(b) by 85 days.

(21) Appl. No.: 13/823,855

(22) PCT Filed: Sep. 15, 2011

(86) PCT No.: PCT/EP2011/004629
§ 371 (c)(1),
(2), (4) Date: Jul. 3, 2013

(87) PCT Pub. No.: WO2012/034700
PCT Pub. Date: Mar. 22, 2012

(65) Prior Publication Data
US 2013/0269530 A1  Oct. 17, 2013

(30) Foreign Application Priority Data

Sep. 16, 2010 (DE) .......................... 10 2010 045 481
Sep. 16, 2010 (DE) .......................... 10 2010 045 482

(51) Int. Cl.
*B01D 53/00* (2006.01)
*B01D 49/00* (2006.01)
(Continued)

(52) U.S. Cl.
CPC ................. *B01D 49/00* (2013.01); *C10J 3/526*
(2013.01); *C10J 3/84* (2013.01); *C10J 3/845*
(2013.01);
(Continued)

(58) Field of Classification Search
USPC .............. 95/289, 224, 228, 230; 96/221, 272, 96/273, 277, 322, 327, 329, 351, 352, 353, 96/354; 422/187, 198
See application file for complete search history.

(56) References Cited

U.S. PATENT DOCUMENTS 2,896,927 A   7/1959  Nagle et al.
4,466,808 A   8/1984  Koog
(Continued)

FOREIGN PATENT DOCUMENTS

DE   145 860 A3    1/1981
DE   37 12 007 A1  10/1988
(Continued)

OTHER PUBLICATIONS

International Search Report, PCT/EP2011/004629, Apr. 5, 2012, 3 pgs.

*Primary Examiner* — Dung H Bui
(74) *Attorney, Agent, or Firm* — Paul D. Strain, Esq.; Strain & Strain PLLC (57) ABSTRACT

The invention relates to a device and method for treating a hot gas flow containing slag and to an entrained-bed gasifier system that comprises the device. The device comprises, in a housing, an inlet arranged at the top for the hot gas flow, an immersion pipe, which is arranged vertically and concentrically in the housing and into which the inlet opens, a coolant bath, into which a lower section of the immersion pipe is immersed, and at least one raw gas outlet opening for cooled raw gas that has been freed of slag. The lower section of the immersion pipe is designed as a radially expanded gas distributor bell in the coolant bath. Said gas distributor bell is formed by a substantially conical jacket surface having a cross-section that expands downward, wherein the jacket surface has a plurality of gas passage openings, which are distributed over the circumference of the gas distributor bell. The dimensions of the gas passage openings increase with the immersion depth in the coolant bath.

17 Claims, 2 Drawing Sheets

(51) Int. Cl.
  *C10J 3/52* (2006.01)
  *C10J 3/84* (2006.01)
  *C10K 1/04* (2006.01)
  *C10K 1/06* (2006.01)
  *C10K 1/10* (2006.01)
  *C10J 3/48* (2006.01)
  *C10J 3/76* (2006.01)

(52) U.S. Cl.
  CPC ... *C10K 1/04* (2013.01); *C10K 1/06* (2013.01); *C10K 1/101* (2013.01); *C10J 3/485* (2013.01); *C10J 3/76* (2013.01)
  USPC ............ 95/289; 95/224; 95/228; 95/230; 96/221; 96/272; 96/273; 96/277; 96/322; 96/327; 96/329; 96/351; 96/352; 96/353; 96/354

(56) References Cited

U.S. PATENT DOCUMENTS

| | | | |
|---|---|---|---|
| 4,474,584 A | * | 10/1984 | Koog ........................ 48/197 R |
| 4,848,982 A | | 7/1989 | Tolle et al. |
| 5,397,381 A | | 3/1995 | Keintzel et al. |
| 8,240,259 B2 | | 8/2012 | Fischer et al. |
| 2009/0202403 A1 | | 8/2009 | Jimenez-Huyke |
| 2011/0058991 A1 | | 3/2011 | Kuske et al. |

FOREIGN PATENT DOCUMENTS

| | | |
|---|---|---|
| DE | 280 975 A1 | 7/1990 |
| DE | 40 25 955 A1 | 1/1991 |
| DE | 280 975 B3 | 3/1993 |
| DE | 42 29 895 A1 | 3/1994 |
| DE | 10 2005 041 930 A1 | 3/2007 |
| DE | 10 2005 042 640 A1 | 3/2007 |
| DE | 10 2007 001385 A1 | 10/2007 |
| DE | 10 2006 031 816 A1 | 1/2008 |
| DE | 10 2008 012732 A1 | 9/2009 |
| DE | 10 2008 035 295 A1 | 2/2010 |
| EP | 0 127 878 A2 | 12/1984 |
| EP | 0 284 762 A2 | 10/1988 |
| EP | 0 926 441 A1 | 6/1999 |

* cited by examiner

DEVICE AND METHOD FOR TREATING A HOT GAS FLOW CONTAINING SLAG

CROSS-REFERENCE TO RELATED PATENT APPLICATIONS

This application is a National Stage of International Application No. PCT/EP2011/004629, filed Sep. 15, 2011, which is based upon and claims the benefit of priority from prior German Patent Application 10 2010 045 481.8, filed Sep. 16, 2010, and German Patent Application No. 10 2010 045 482.6, filed Sep. 16, 2010, the entire contents of all of which are incorporated herein by reference in their entirety.

The invention relates to a device and a method for treating a hot gas flow containing slag. The invention relates, furthermore, to an entrained-bed gasifier plant which comprises the device according to the invention.

For the cooling of hot reaction gases laden with slag and for separating the slag, industrially produced reaction gases are brought into contact with a coolant in a way known per se, for which purpose the spraying of a cooling liquid into the hot gas flow (free space quenching) and/or the conducting of the reaction gas through a coolant bath (immersion quenching) are/is employed. Both quenching variants have advantages and disadvantages. While free space quenching presupposes a high quality of the cooling water, multiple use of the coolant, depending on the solid fraction and its properties, can be achieved with immersion quenching. The employing of one quenching variant or the other depends on the external conditions of the preceding process and on the properties of the batch products. It often becomes clear only while the quenching device is in practical use whether quenching devices was the optimum choice. Also, the process conditions, on which the planning of process management is based, may change in the course of time. This includes, for example, the variable quality of the batch products. Combinations of free space quenching and immersion quenching are therefore known, the advantage of which is adaptability to changed conditions of use.

The term "coolant" is used hereafter to represent all fluid coolants or coolant mixtures, in particular water, suitable for gas quenching.

DD 280 975 B3 describes a method and a device for cooling and purifying hot gases laden with slag or dust. For this purpose, the gas to be cooled and purified flows as a free jet into a quenching device, in which is located a coolant bath in which the slag particles are separated. Level with the gas inlet port, and in the shadow of the downwardly directed free jet of hot gas, up to three nozzle rings are arranged, the spray nozzles of which spray the hot gas jet essentially orthogonally to the jet direction, the third nozzle ring being directed downward into the recirculation flow of the gas, so that nozzle contamination is avoided.

DE 10 2005 042 640 A1 describes a method and a device for generating synthesis gases from ash-containing fuels by means of particle quenching and waste heat recovery. The quenching space is arranged vertically below the gasification reactor; free space quenching takes place there by the injection of coolant or by the supply of a cool gas, so that the entrained liquid slag cools to an extent such that it can no longer adhere to the metallic surfaces of the reactor wall.

U.S. Pat. No. 4,466,808 discloses a method for gas cooling and ash separation with two cooling zones, and in this case, at the gas inlet of the immersion pipe, in a nozzle ring unit with two outlet directions, a cooling water film is generated on the immersion pipe inner wall and at the same time cooling water is injected at an angle of about 45° downward into the gas stream in the immersion pipe. The precooled gas is introduced into an immersion bath via an immersion pipe designed to be serrated at the bottom and, after being deflected anew onto the immersion bath surface, is discharged out of the quenching space.

EP 0 284 762 A2, DE 10 2005 041 930 A1, DE 10 2006 031 816 A1 and DE 10 2008 035 295 A1 disclose gasification methods and devices with quench cooling of the gas, in which the gas flowing into the quenching space is cooled by cooling liquid being injected laterally into the gas flow via nozzles arranged at different heights and the slag in this case separated is collected in the immersion bath.

DD 145 860 discloses a method and a device for treating reaction gases from pressure gasification which is aimed particularly at simultaneous direct cooling and partial dedusting, together with steam saturation of the gases. For this purpose, the crude gas to be treated is introduced through a gas feed pipe into a bell suspended in a coolant bath and is distributed uniformly in the coolant bath by this bell by means of outlet ports from the top side of the latter. In order to achieve guidance of the rising gases, guide pipes freely arranged above the outlet ports are provided, above which pipes freely arranged hoods prevent surging of the coolant surface. By means of this device, the settling of solids on the reactor walls is to be avoided at low outlay in terms of apparatus and energy.

EP 0 127 878 describes a method for cooling and the removal of slag from a hot synthesis gas, the hot gas being brought in a first zone into contact with a coolant film on the inner wall of an immersion pipe and in a second zone into contact with a coolant sprayed into the immersion pipe cross section, flowing through a coolant bath in a third zone and being brought in a fourth zone into renewed contact with a sprayed coolant. The immersion pipe has a constant cross section and a serrated lower margin for the uniform distribution of the gas bubbles in the immersion bath. A device suitable for the method has, below the hot gas inlet, an immersion pipe cooled by means of a coolant film, in the lower third of the immersion pipe a nozzle ring located on the immersion pipe and directed into the immersion pipe interior, an immersion bath and a downwardly directed spray device, arranged on the outside of the immersion pipe, below the crude gas outlet.

The disadvantage of these solutions is that the properties of the quenched gas fluctuate undesirably with the throughput of gas. The known quenching devices have insufficient flexibility, so that the quenching action (gas cooling and slag separation) of the devices depends undesirably upon the gas throughput.

Proceeding from this prior art, the object on which the present invention is based is to provide a device for treating a hot gas flow containing slag, with which device approximately constant separation of the slag and constant gas cooling take place even in the event of fluctuations in the volume flow of the hot gas stream, so that a crude gas having a quality largely independent of the gas throughput rate is provided.

Further, improved separation of the slag is to take place during the cooling of a slag-entraining hot gas flow, so that crude gas freed of slag and having a quality independent of the gas quantity generated is provided. At the same time, the device and method are to eliminate further disadvantages which lie in the insufficient protection of the contact surfaces against slag adhesions which lead to process faults and frequent cleaning cycles, so that long service lives are obtained, a low outlay in cleaning terms is required and multiple use of the coolant becomes possible.

This object is achieved by means of a device having the features of claim 1 and by means of the entrained-bed gasifier plant having the features of claim 11. The object of providing a corresponding method is achieved by means of a method having the features of claim 12. Developments of the device and of the method are given in the subclaims.

A device according to the invention for treating a hot gas flow containing slag has in a housing a hot gas flow inlet which is arranged on top and which issues into an immersion pipe vertically arranged concentrically in the housing. Moreover, the device has a coolant bath, into which the immersion pipe dips with a lower portion, and also one or more crude gas outlet ports which, for the outlet of the cooled crude gas freed of slag, will be located on the lateral housing wall. The lower portion of the immersion pipe is in this case designed in the coolant bath as a radially widened gas distributor bell, specifically by virtue of an essentially conical surface area with a downwardly widening cross section. This surface area has a multiplicity of gas passage ports which are distributed on the circumference of the gas distributor bell. The dimensions of the gas passage ports increase with the depth of penetration of the bell in the coolant bath.

As a result of the conical surface area of the gas distributor bell, which widens the flow cross section of the immersion pipe for the hot gas in the gas outlet region from the immersion pipe, and as a result of the multiplicity of gas passage ports in the surface area, which are distributed approximately uniformly over the circumference of the gas distributor bell and the diameters of which increase, staggered from the top downward, in rows, constant throughflow conditions are afforded independently of the flow path of the hot gas. Thus, advantageously, uniform gas distribution in the coolant bath and, on account of the large surface of the gas bubbles generated, a good washing effect can be promoted with the gas passage ports. On account of the conical design of the gas distributor bell and of the size of the gas passage ports which increases with the depth of penetration in the gas distributor bell, this washing effect remains approximately constant, even in the case of different hot gas volume flows, since, as a result of the downwardly widening surface area of the gas distributor bell, a larger overall port cross section of the gas passage ports on the circumference is available in the case of a higher gas throughput and a consequently falling coolant level in the gas distributor bell.

Furthermore, what is advantageously achieved by the port width to the gas passage ports which increases with depth and by the consequently decreasing throttle action is that the pressure loss growing with an increasing depth of penetration when the gas flows from the coolant bath is thereby compensated, so that a constant flow resistance of the immersion bath can be achieved virtually independently of the gas throughput. The sum of the gas pressure losses during flow through the passage ports and the coolant bath is thus kept approximately constant because the dimension of the passage ports increases downward.

The relatively reduced diameter of the immersion pipe in relation to the gas distributor bell, the relative reduction in the immersion pipe diameter expediently being made possible by the widening gas distributor bell, possesses a substantial advantage, as compared with known variants having a constant immersion pipe diameter. On account of the larger surface of the coolant bath between the housing and immersion pipe, the surface turbulences are lower, so that fluctuations in the coolant level occur to a much lesser extent, and also the fraction of the coolant entrained by the cooled crude gas and therefore the coolant consumption for immersion quenching can be reduced.

Thus, approximately constant separation of the slag and constant gas cooling can take place, even in the event of fluctuations in the volume flow of the hot gas stream, and a crude gas having a quality largely independent of the gas throughput rate can be provided.

In one embodiment, the immersion pipe of the device according to the invention has at an upper end an annular coolant chamber, by means of which a coolant film is generated on the inner wall of the immersion pipe. In this case, the immersion pipe is designed to be double-walled over its entire length, there being between an inner pipe and an outer pipe an annular gap which is connected to the annular coolant chamber. In this case, a coolant feed line connected to the annular gap is arranged on a lower portion of the immersion pipe.

Owing to the double-walled design of the immersion pipe over its entire length, the annular gap being connected to the annular coolant chamber so as to generate the coolant film on the inner wall of the inner pipe, while the coolant feed line connected to the annular gap is arranged on the lower portion of the immersion pipe, forced cooling of the immersion pipe and better thermal decoupling between the hot gas flow in the immersion pipe and the cooled crude gas after immersion quenching are achieved. Advantageously, the thermally highly loaded immersion pipe is cooled by the proposed solution more intensively than solely by the coolant film known from the prior art, with the result that the coolant film generated at the gas inlet on the immersion pipe inner surface evaporates less quickly and therefore extends essentially over the entire immersion pipe length, so that adhesions of slag to the immersion pipe are appreciably reduced.

In a preferred variant, the gas passage ports are of uniform, in particular circular, design and are distributed approximately uniform over the circumference of the gas distributor bell.

A ratio of the maximum diameter of the gas distributor bell to the diameter of the immersion pipe may lie in a range of 1.5 to 3.

Furthermore, there may be provision whereby the device has a collecting funnel which extends conically from a slag offtake at the bottom of the housing as far as the inner wall of the housing. The gas distributor bell and the collecting funnel are in this case arranged with respect to one another such that a lower margin of the gas distributor bell projects into the collecting funnel.

A further embodiment of the device according to the invention relates to a combination of prequenching by means of the coolant film, of immersion quenching the coolant bath and of free space quenching both in the immersion pipe and in an interspace between the immersion pipe and the housing. This free space quenching is implemented by means of two or more spray units which are in each case connected fluidically to a coolant feed line from outside the housing and are arranged concentrically around the immersion pipe. The spray units are directed into the gas flow, a first spray unit being directed into the immersion pipe interior and a second spray unit into the interspace.

Advantageous embodiments of the spray units relate to the fact that the first spray unit comprises at least one nozzle ring, preferably two nozzle rings, in an upper third of the immersion pipe. The nozzle rings are arranged around the outer circumference of the immersion pipe and have nozzles which extend through the double wall into the immersion pipe. The nozzles of the nozzle rings are directed radially inward and may be inclined downward at an angle preferably in a range of 0° to 30° with respect to the horizontal.

The second spray unit may likewise be designed as a nozzle ring which is arranged in an upper region of the interspace and the main spraying direction of which points downward, so that the inner wall of the housing and the outer pipe can be wetted virtually completely with coolant by the nozzle ring.

Furthermore, at least the coolant for the first spray unit and the coolant for the second spray unit may be provided by different coolant supply devices, the coolant for the second spray unit containing smaller particles than the coolant for the first spray unit.

In the case of water as coolant, process water, without prior treatment, may thus be used for the first spray unit and gas condensates and/or gray water may be used for the second spray unit.

By the combination of prequenching by the coolant film, of free space quenching in the immersion pipe, of immersion quenching in the coolant bath and of further free space quenching in the gas collecting space or interspace after immersion quenching, gas quenching can advantageously be coordinated with the gas properties in a flexible way. In addition, the annular coolant chamber for generating the coolant film and the spray units ensure that the entire contact surface of the quenching space is wetted with cooling liquid and therefore accretions of slag can be avoided virtually completely or even entirely.

A further embodiment relates to the fact that the crude gas outlet port is arranged in an upper third of the housing. In the event that a plurality of outlets are provided, these may be arranged at different heights in the upper third of the housing.

In a further preferred design of the device, a diameter of the immersion pipe may correspond to double to five times the diameter of the hot gas inlet.

Thus, the device according to the invention, generally for treating a hot gas flow containing slag, is therefore suitable to follow a device which generates the hot gas flow containing slag. This may be, in particular, an entrained-bed gasifier, so that an entrained-bed gasifier plant comprises in addition to the entrained-bed gasifier, downstream of this, the device according to the invention. In this case, the inlet for the hot gas flow of the device is connected fluidically to a hot gas outlet of the entrained-bed gasifier.

One embodiment of the method according to the invention for treating a hot gas flow containing slag by means of a quenching action virtually independent of the gas throughput, comprising gas cooling and slag separation, relates to a method in which a hot gas flow flows via an inlet into an immersion pipe in a housing, a coolant film being generated on the inner wall of the immersion pipe at the upper end of the latter, and the hot gas flow flowing along the immersion pipe being precooled in contact with the coolant film on the inner wall of the immersion pipe which dips with a lower portion into a coolant bath. According to the invention, subsequent immersion quenching takes place by the dispersion of the precooled hot gas flow, introduced through the immersion pipe into the coolant bath, in the coolant bath by means of gas passage ports in a conical gas distributor bell which adjoins the immersion pipe, the dimensions of the gas passage ports being dependent upon the depth of penetration.

Advantageously, owing to the double-walled design of the immersion pipe, the wall of the immersion pipe can be cooled from inside, with the result that not only the immersion pipe itself, but also the coolant film formed on it are cooled, so that less or no slag is deposited on the inner wall of the immersion pipe. Furthermore, the supply of coolant takes place at a lower portion of the immersion pipe, so that the coolant, first by flowing upward through the annular gap formed between the inner pipe and the outer pipe of the immersion pipe, provides internal cooling over the entire length of the immersion pipe and then, after passing through the annular gap, enters the annular coolant chamber at the upper end of the immersion pipe and is used for feeding the coolant film. Owing to the reduction in slag deposits on the inner wall of the immersion pipe, long service lives can be brought about and only a low outlay in terms of cleaning is required.

Developments of the method relate to the fact that the hot gas flow, in addition to prequenching by the coolant film, is additionally cooled by flash quenching by coolant being sprayed in during flow through the immersion pipe. Finally, the crude gas flow emerging from the coolant bath is cooled in a further free space quenching step by coolant being sprayed in.

The proposed solution will be explained below by way of example.

The figures are to be understood merely as a diagrammatic and exemplary illustration of an especially advantageous embodiment of the invention. In these.

Figure 1:
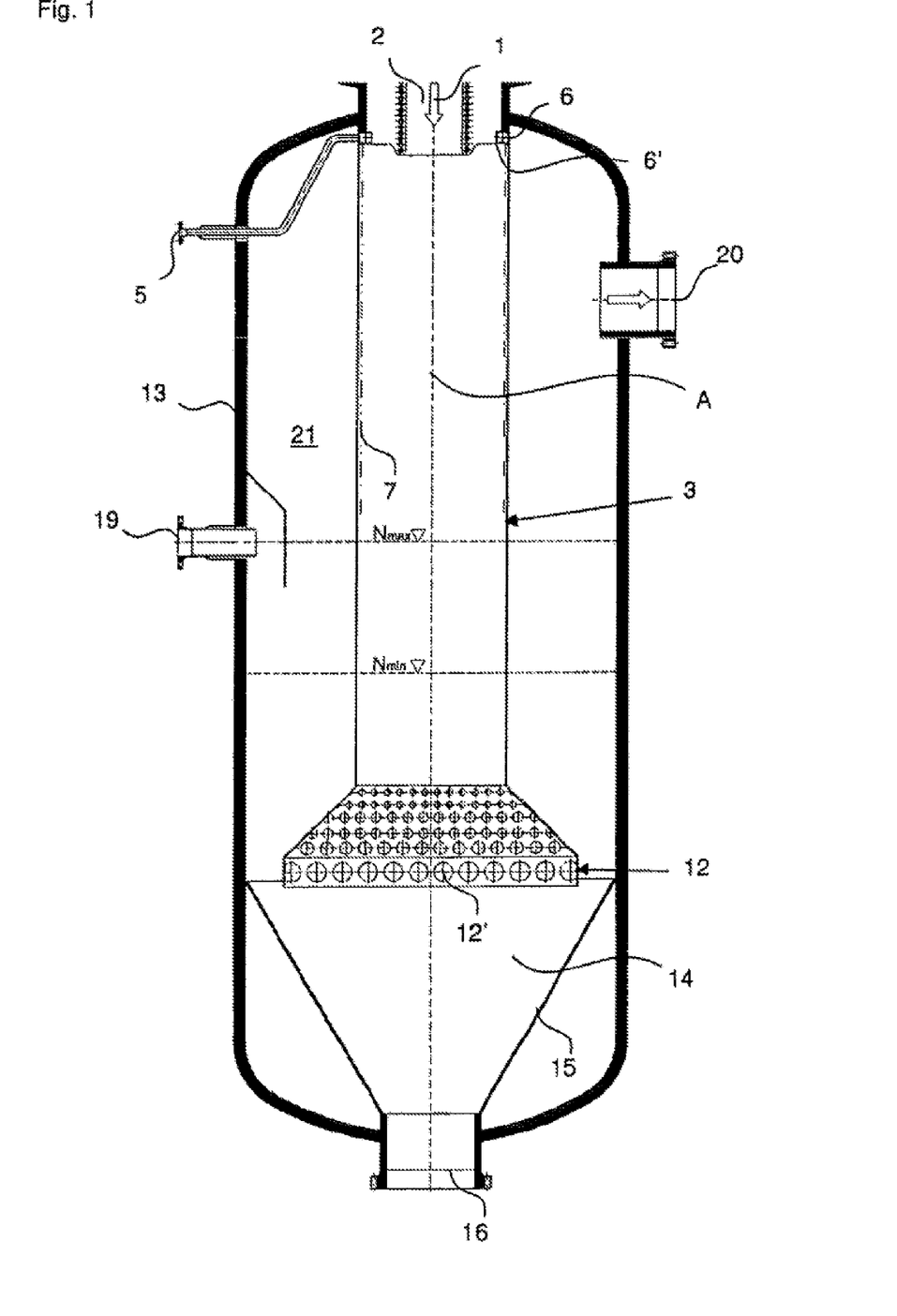
FIG. 1 shows a lateral sectional view of a device according to the invention for the immersion quenching of a hot gas flow.
Figure 2:
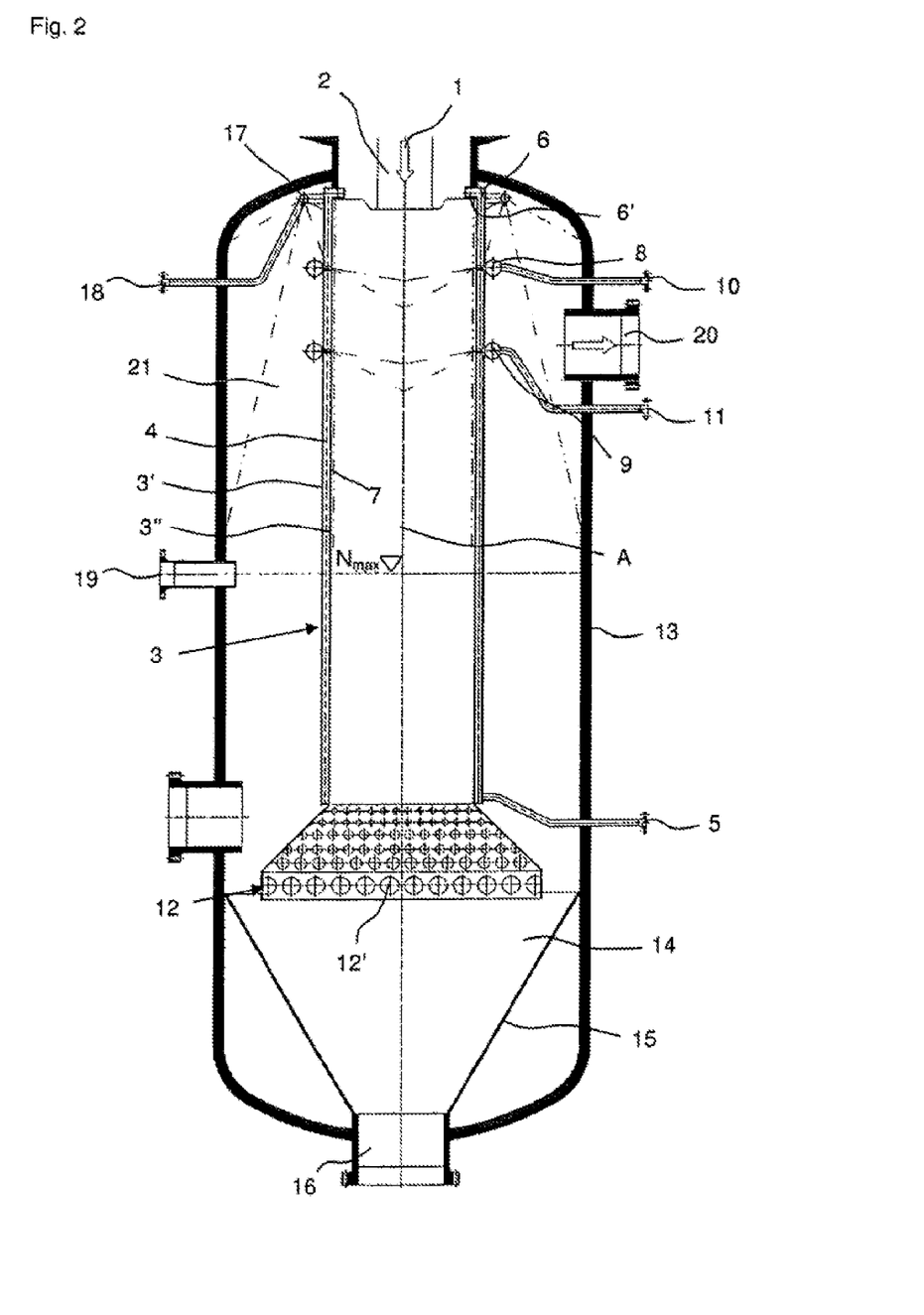
FIG. 2 shows a lateral sectional view of a device according to the invention in combination with further quenching devices.

The apparatus, illustrated in FIGS. 1 and 2, for treating a hot gas flow containing slag has a housing 13 with an inlet 2 for a hot gas flow 1, which inlet is arranged on top and issues into an immersion pipe 3 vertically arranged concentrically to the housing. The inlet 2 for the hot gas containing slag ends with a slag drop-off edge within the upper portion of the immersion pipe 3. The diameter of the immersion pipe 3 can be double to five times the diameter of the inlet 2.

At the upper end of the immersion pipe 3, that is to say at the gas inlet port of the immersion pipe 3, a known annular coolant chamber 6 is arranged which has on its underside a circumferential outlet port 6' which extends along the inner wall of the immersion pipe 3 and serves for generating a preferably closed coolant film 7 flowing downward along the inner wall of the immersion pipe 3.

Advantageously, the annular coolant chamber 6 is formed inwardly by a collar-shaped widening of the immersion pipe 3, in that the immersion pipe 3 has adjoining it an end-face collar surface which, together with an angled inner cylindrical portion, delimits the annular coolant chamber 6 as far as the outlet port 6'. The outlet port 6' may run around virtually continuously or may be formed from a plurality of ports distributed over the circumference of the immersion pipe 3.

To feed the annular coolant chamber 6 with coolant, a coolant feed line 5 led radially through the housing 13 to the immersion pipe 3 is arranged at the annular coolant chamber 6. In FIG. 1, the coolant line 5 issues directly into the annular coolant chamber 6.

In the embodiment of the device shown in FIG. 2, the immersion pipe 3 is designed to be double-walled over its entire length, the double wall being formed by an inner pipe 3' and an outer pipe 3" which are arranged concentrically and enclose an annular gap 4 which is connected at the upper end to the annular coolant chamber 6 in such a way that coolant emerging from the annular gap 4 enters the annular coolant chamber 6. The annular gap 4 is connected in turn to the coolant feed line 5 which is in this case arranged at a lower portion of the immersion pipe 3.

As may be gathered from both figures by referring to the coolant level N, the immersion pipe 3 dips with its lower portion into a coolant bath 14. Arranged at the lower end of the immersion pipe 3 is a gas distributor bell 12 having a cross section widening conically downward essentially continuously. The surface area does not have to be configured conically over its entire height, and, for the flow conditions to be better adapted to the quenching process, it may even be advantageous, for example, to equip the gas distributor bell 12 with a cylindrical surface area portion on the open underside, as illustrated in the drawing. Furthermore, instead of a straight lower surface area contour, a wavy or serrated contour may also be advantageous.

The maximum diameter of the gas distributor bell 12 with respect to the diameter of the immersion pipe 3 lies in the range of 1.5 to 3, preferably between 1.5 and 2.

The gas distributor bell 12 has in its frustoconical surface area a multiplicity of gas passage ports 12' which are distributed preferably uniformly over the circumference in a plurality of horizontal rows arranged one above the other. The gas passage ports 12' are configured uniformly, preferably circularly. It is likewise possible to have ports deviating from the circular shape, for example elliptic or rectangular ports with rounded corners or ports with discontinuous contours which influence the bubble size and the bubble breakaway. Furthermore, shaped and punched metal sheets may also be used for the surface area, the gas passage ports being, for example, of funnel-shaped or nozzle-like design.

The dimensions of the gas passage ports 12' vary with the depth of penetration. The diameter of the gas passage ports 12' on top of the transition to the immersion pipe 3 is smaller than the diameter of the gas passage ports 12' at the downwardly pointing margin, facing away from the immersion pipe 3, of the gas distributor bell 12, the increase in size, row by row, of the gas passage ports 12' into the depth of the coolant bath 14 being selected in such a way that the sum of the gas pressure losses during flow through the gas passage ports 12' and the coolant bath 14 remains approximately constant.

The device is configured in the bottom region in such a way that the lower margin of the gas distributor bell 12 projects into a collecting funnel 15 for the slag particles separated out of the hot gas, said collecting funnel extending in the coolant bath 14 conically from a slag offtake 16 arranged at the housing bottom as far as the inner wall of the housing 13.

Furthermore, the housing 13 has a coolant overflow 19 which is arranged at a maximum coolant level $N_{max}$ required for immersion quenching. In the case of water as coolant, process water, without prior treatment, can be used for the coolant film 7 and the coolant bath 14.

The excess water which has not evaporated in the quencher leaves the housing 13 at the overflow 19 and is treated. With removal of the solid fractions, the water can be used again and is designated as gray water and used several times for quenching. Process water can be used without prior treatment for the coolant film 7 and the coolant bath 14.

Furthermore, the device according to the invention has an interspace 21, formed between the housing 13 and immersion pipe 3, for the quenched gas, as a collecting space above the coolant immersion bath 14 and a crude gas outlet 20 for the cooled crude gas largely freed of slag, said crude gas outlet usually being arranged in the upper third of the housing 13. There may be provision whereby the device has more than one crude gas outlet 20. If two or more crude gas outlets are provided, these may be arranged at different heights in the upper third of the housing 13 for the purpose of adaptation to the hot gas properties.

To avoid deposits of constituents of the ash, which are mainly $CaCO_3$ constituents and also alkali sublimates which, according to experience, adhere above all to dry hot surfaces, additional coolant may be sprayed in, as illustrated in FIG. 2, via a further spray unit, preferably designed again as a nozzle ring 17, in the upper portion of the interspace 21, surrounding the immersion pipe 3, above the coolant bath 14. The nozzles arranged annularly around the immersion pipe 3 have a broad spray cone, the main spraying direction pointing downward. In addition to the effect of keeping moist the contact surfaces, delimiting the interspace 21, of the housing 13, immersion pipe 3 and further fittings, such as, for example, the coolant feed lines 5, 10, 11, additional atomization of coolant in the crude gas flow is achieved, with the result that the washing and cooling effect is further improved. The nozzle ring 17 is likewise assigned a coolant feed line 18.

Instead of the single nozzle ring 17 which surrounds the upper end of the immersion pipe 3, it is also possible to install a plurality of nozzle rings arranged above the coolant bath 14 or nozzle groups deviating from the ring arrangement and having individual nozzles, in order to spray the interspace 21 completely.

The device according to the invention is provided, in particular, for cooling a hot gas flow 1 containing slag and for separating the slag out of the hot gas flow 1 of gasifier plants for carbon-containing fuels, for example entrained-bed gasifier plants of biomass gasifiers. For this purpose, the device according to the invention follows the entrained-bed gasifier downstream and is connected fluidically to this, the device preferably being arranged directly at a hot gas outlet below a combustion chamber of the entrained-bed gasifier.

In this case, hot gas is conducted out of a reaction space, preceding the device, of the entrained-bed gasifier into the quenching space located underneath. Multistage cooling of the hot gas and separation of the slag from the gas take place there, a combination of prequenching and, if appropriate, flash quenching in the immersion pipe, immersion quenching in the coolant immersion bath and, if appropriate, renewed free space quenching in the crude gas collecting space being employed.

In both embodiments shown in the figures, the hot gas flow 1 containing slag is first led vertically downward through the inlet 2 into the film-cooled immersion pipe 3. Prequenching of the supplied hot gas flow 1 takes place there in contact with the coolant film 7 which is generated on the inner wall surface of the immersion pipe 3. The coolant film 7 brings about, in addition to the prequenching of the hot gas flow 1 supplied, an improved transport of the slag particles away into the coolant bath 14, thereby reducing or avoiding settling of slag on the inner wall of the immersion pipe.

If the method for treating hot gas flow containing slag is carried out by means of a device, shown in FIG. 2, with a double-walled immersion pipe 3, the coolant film 7 formed on the inside of the immersion pipe 3 is cooled by the internal cooling of the immersion pipe 3 provided by the coolant which is supplied through the annular gap 4 and feeds the coolant film 7, with the result that the hot gas flow 1 containing slag is cooled in contact with the coolant film 7. Since the coolant for the coolant film 7 is supplied through the annular gap 4, the immersion pipe wall is forcibly cooled over the entire height. As a result, that coolant fraction of the coolant film 7 which evaporates in the hot gas flow 1 is substantially lower than is known from the prior art, and the coolant film 7 is maintained virtually over the entire immersion pipe length. Furthermore, by virtue of the intensive immersion pipe cooling, the outlay in terms of the thermal protection of the surrounding housing 13 can be at least reduced. The stable coolant film 7 generated inside the immersion pipe brings about, in addition to prequenching of the hot gas flow 1 supplied, improved transport of the slag particles away, in that, because of the continuous coolant film 7, settling of solidifying and solidified slag on the inner wall of the immersion pipe is reduced or avoided.

In the embodiment of the device according to the invention, as shown in FIG. 2, not only does prequenching of the hot gas flow 1 by means of the coolant film 7 take place inside the immersion pipe 3, but the immersion pipe 3 also forms a cylindrically configured flash quenching space inside the device. Thus, with coolant being sprayed in during the flow through the immersion pipe 3, flash quenching of the hot gas flow 1 is achieved.

In FIG. 2, a first spray unit is arranged in the upper third of the immersion pipe 3 above the level N of the coolant bath 14 present in the housing 13, the spray unit comprising an upper nozzle ring 8 on the outer circumference of the immersion pipe 3 and preferably in addition at least one lower nozzle ring 9, and nozzles distributed over the circumference of the nozzle rings 8, 9 penetrate through the immersion pipe 3, double-walled in the present example, and are directed radially into the interior of the immersion pipe. The nozzle rings 8, 9 are fed with coolant from outside via coolant feed lines 10, 11.

The designation "nozzle" relates in this context in the simplest case to a tubular device with a defined inner contour, by means of which coolant or usually employed quenching water is sprayed into the interior of the immersion pipe 3 in a defined direction at a predeterminable pressure. The nozzle rings 8, 9 generate over the inner cross section of the immersion pipe 3 spray curtains lying vertically one above the other and directed radially inward with respect to the axis A. The nozzles may be oriented approximately horizontally for generating a horizontal spray curtain, but, as indicated in the figure by the dash-dot-dot lines, they may also be inclined in their jet direction downward at an angle of 10° to 30° with respect to the horizontal. Instead of the nozzle rings 8, 9, differently designed atomizers may also be used as spray units, in so far as they fill the cross section of the hot gas flow 1 approximately completely with coolant mist.

The meeting of the hot gas flow 1 containing slag with the finely distributed coolant gives rise to a very rapid cooling (flash quenching) and saturation of the gas with the water used as coolant during passage through the spray curtains. The flash quenching carried out in the double-walled immersion pipe 3 by means of the spray units corresponds to free space quenching and causes the slag drops in the hot gas flow 1 not only to cool and solidify, but also at the same time causes agglomeration of the slag particles, assisted by the coolant film 7 adhering to the inner wall of the inner pipe 3', so that better separation of the slag particles in the coolant bath 14 can be achieved.

The prequenched and, if appropriate, flash-quenched gas flow is introduced, together with the solidifying or already solidified slag particles contained in the gas flow, into the coolant bath 14 and immersion-quenched there. The precooled hot gas flow 1 is dispersed at the lower end of the immersion pipe 3 in the coolant bath 14 with the aid of the gas passage ports 12', having dimensions dependent upon the depth of penetration, in the conical gas distributor bell 12, illustrated in both figures, turbulences which reinforce the washing effect arising in the coolant bath 14. While the direction of flow of the gas introduced is deflected at the gas distributor bell 12 which adjoins the lower end of the immersion pipe 3 and flows through the coolant bath 14 upward into an interspace 21 formed between the immersion pipe 3 and housing 13 and to at least one crude gas outlet 20, the slag separated from the gas by means of the washing effect and the reversal in direction of flow sinks in the gravity field on the principle of density separation. The collecting funnel 15 delivers the solidified slag agglomerates to a slag offtake 16 at the lowest point in the bottom of the housing 13, so that the slag can be taken off or discharged there in batches or continuously.

The gas passage ports 12' introduced into the gas distributor bell 12 promote good gas distribution in the coolant bath 14 and thereby contribute to a good washing effect. As a result of the arrangement in the gas distributor bell 12 of the gas passage ports 12' which vary in size have become smaller upwardly and which do not necessarily have to be circular, but may also have other contours, this washing effect remains approximately constant, even in the case of different hot gas volume flows, because the pressure loss increasing in the depth of the coolant bath 14 is compensated by the lower pressure loss of the larger gas passage ports 12'. In the case of lower hot gas throughputs, the hot gas flows through the near-surface smaller gas passage ports 12' with a higher pressure loss and small gas bubbles are generated in the coolant immersion bath 14, while, in the case of higher gas throughputs, the gas also flows through the larger gas passage ports 12' which are arranged at a lower level and which bring about lower pressure losses.

The crude gas flow freed of slag collects in the interspace 21 and then leaves the device through the crude gas outlet 20. Two or more crude gas outlets 20 at different heights in the upper third of the housing 13 also allow variable utilization of the housing 13 for different quenching variants. As shown in FIG. 2, in the interspace 21 the crude gas emerging from the immersion bath 14 can be cooled once more by coolant being sprayed in by means of the nozzle ring 17, and in this case residual slag particles can also be washed out.

The separated slag is removed through the slag offtake 16. The collecting funnel 15 protects the housing from slag deposits and wear. The coolant overflow 19 maintains in the housing 13 a coolant level N which is required for gas purification and the residual cooling of the gas.

On account of the continuous wetting of the contact surfaces which is provided by a device according to an embodiment described in connection with FIG. 2, and because of the intensive contact surface cooling and multistage quenching, the device can be operated with long service lives and at low outlay in cleaning terms, while at the same time the prequenching/flash quenching in the immersion pipe, which are separated by the immersion bath, and spraying in the interspace 21 make it possible to have in prequenching/flash quenching a multiple utilization of the coolant or water laden with solid fractions, and in this case the coolant/water consumption can be controlled as a function of a gas quantity generated.

For the complete wetting of the housing 13, the nozzle ring 17 or the other spray units is or are preferably operated with a coolant rate of between 10 and 100 m$^3$/h, with a nozzle outlet velocity of 2 to 10 m/s and with a drop spectrum of 100 to 3000 μm.

This exemplary embodiment is based on the use in the invention in conjunction with a coal dust pressure gasifier having a gasifier output of 80 000 Nm$^3$/h (dry). In this example, the nozzle rings 8, 9 arranged on the immersion pipe 3 and the nozzles led through the double-walled immersion pipe 3 can be fed with a coolant flow of 30 to 50 m$^3$/h.

By selecting or adapting the coolant throughput of individual or several fittings of those described in the device, comprehensive adaptation to free space quenching or immersion quenching or to a combination of these is possible.

Furthermore, coolant or water of different quality can be used for the various nozzle groups as a function of the required drop size and outlet velocity. For the internal cooling of the immersion pipe 3 and the charging of the nozzle ring 17 where the water is sprayed especially finely, water having a low solid fraction and a small solid particle size must be used. The water quality for flash quenching inside the immersion pipe can be lower. While gas condensates and gray water can be used for spraying the interspace 21, the use of process water without prior treatment is sufficient for forming the water film. It is therefore advantageous if at least the coolant for the first spray unit/immersion pipe and the coolant for the second spray unit are provided by different coolant supply devices. Since the water consumption at the individual quenching devices is dependent upon the gas throughput and its solid load, it is expedient to regulate the water consumption at the individual consumers. The evaporated water quantity inside the quencher can be determined thermodynamically. The water quantity used should be about 20% greater than the evaporated water quantity. Corresponding control of the supply of water to the quenching devices takes place by means of a process management system.

List of Reference Symbols
1 Hot gas flow
2 Inlet for the hot gas flow
3, 3', 3" Double-walled immersion pipe, inner pipe, outer pipe
4 Annular gap
5 Coolant feed line
6, 6' Annular coolant chamber, outlet port
7 Coolant film
8 Nozzle ring
9 Nozzle ring
10 Coolant feed line
11 Coolant feed line
12, 12' Gas distributor bell, gas passage ports
13 Housing
14 Coolant bath
15 Collecting funnel
16 Slag offtake
17 Nozzle ring
18 Coolant feed line
19 Overflow
20 Crude gas outlet
21 Interspace
A Axis of immersion pipe and housing
N Level of the coolant bath 14

The invention claimed is:

1. A device for treating a hot gas flow containing slag in a housing, with
   an inlet, arranged on top, for the hot gas flow,
   an immersion pipe which is vertically arranged concentrically in the housing and into which the inlet issues,
   a coolant bath, into which the immersion pipe dips with a lower portion, and
   at least one crude gas outlet port for cooled crude gas freed of slag,
   the lower portion of the immersion pipe being designed as a radially widened gas distributor bell in the coolant bath,
   wherein
   the gas distributor bell is formed by an essentially conical surface area with a downwardly widening cross section, and
   the surface area has a multiplicity of gas passage ports, the gas passage ports being distributed over the circumference of the gas distributor bell, and the dimensions of the gas passage ports increasing with the depth of penetration of the coolant bath.

2. The device as claimed in claim 1, wherein
   the immersion pipe is designed to be double-walled over its entire length, an annular gap being present between an inner pipe and an outer pipe of the immersion pipe,
   an annular coolant chamber is arranged at an upper end of the immersion pipe for generating a coolant film on the inner wall of the immersion pipe,
   the annular gap is connected to the annular coolant chamber, and
   a coolant feed line connected to the annular gap is arranged at a lower portion of the immersion pipe.

3. The device as claimed in claim 1, wherein the dimensions of the gas passage ports increase downward in such a way that the sum of the gas pressure losses during flow through the gas passage ports and the coolant bath remains approximately constant independently of the flow path of the gas in the coolant bath.

4. The device as claimed in claim 1, wherein a maximum diameter of the gas distributor bell with respect to the diameter of the immersion pipe gives a quotient of 1.5 to 3.

5. The device as claimed in claim 1, wherein a collecting funnel extends conically from a slag offtake arranged at a bottom of the housing as far as the inner wall of the housing, the gas distributor bell and the collecting funnel being arranged with respect to one another such that a lower margin of the gas distributor bell projects into the collecting funnel.

6. The device as claimed in claim 1, wherein the at least one crude gas outlet port is arranged in an upper third of the housing, a plurality of outlets being capable of being arranged at different heights in the upper third of the housing.

7. An entrained-bed gasifier plant, wherein the entrained-bed gasifier plant comprises an entrained-bed gasifier and a device as claimed in claim 1, the device being arranged downstream of the entrained-bed gasifier, and the inlet for the hot gas flow being connected fluidically to a hot gas outlet of the entrained-bed gasifier.

8. The device as claimed in claim 1, wherein at least two spray units connected fluidically in each case to a coolant feed line from outside the housing and directed into the gas flow are arranged concentrically around the immersion pipe, at least the first spray unit being directed into the immersion pipe interior and the second spray unit being directed into an interspace formed between the immersion pipe and the housing.

9. The device as claimed in claim 8, wherein the first spray unit comprises at least one nozzle ring in an upper third of the immersion pipe, each nozzle ring being arranged around the outer circumference of the immersion pipe and having nozzles which extend through the double wall into the immersion pipe.

10. The device as claimed in claim 9, wherein the nozzles of the at least one nozzle ring are directed radially inward and are inclined downward at an angle preferably in a range of 0° to 30° with respect to the horizontal.

11. The device as claimed in claim 8, wherein the first spray unit comprises two nozzle rings in an upper third of the immersion pipe, each nozzle ring being arranged around the outer circumference of the immersion pipe and having nozzles which extend through the double wall into the immersion pipe.

12. The device as claimed in claim 11, wherein the nozzles of the two nozzle rings are directed radially inward and are inclined downward at an angle preferably in a range of 0° to 30° with respect to the horizontal.

13. The device as claimed in claim 8, wherein the second spray unit is designed, in particular, as a nozzle ring with a main spraying direction downward and is arranged in an upper region of the interspace, the inner wall of the housing and the outer pipe being wettable with coolant virtually completely by the nozzle ring.

14. A method for treating a hot gas flow containing slag,
a hot gas flow flowing into an immersion pipe in a housing via an inlet, and
a coolant film being generated on the inner wall of the immersion pipe at the upper end of the immersion pipe,
the hot gas flow which flows along the immersion pipe being precooled in contact with the coolant film at the inner wall of the immersion pipe,
characterized by the steps
introduction of the precooled hot gas flow through the immersion pipe, which dips with a lower portion into a coolant bath, into the coolant bath,
dispersion of the gas flow by means of gas passage ports, having dimensions dependent on the depth of penetration, in a conical gas distributor bell, which adjoins the immersion pipe, in the coolant bath, wherein the gas distributor bell is formed by an essentially conical surface area with a downwardly widening cross section, and the surface area has a multiplicity of gas passage ports, the gas passage ports being distributed over the circumference of the gas distributor bell, and the dimensions of the gas passage ports increasing with the depth of penetration of the coolant bath.

15. The method as claimed in claim 14, further comprising the steps
supply of a coolant to an annular gap between an inner pipe and an outer pipe of the immersion pipe,
internal cooling of the immersion pipe by the coolant, the coolant flowing upward in the annular gap,
cooling of the coolant film by the internal cooling of the immersion pipe, and
generation of the coolant film at the upper end of the immersion pipe by means of the coolant emerging from the annular gap and used for internal cooling.

16. The method as claimed in claim 14, wherein the hot gas flow is additionally cooled by coolant being sprayed in during the flow through the immersion pipe.

17. The method as claimed in claim 14, wherein a crude gas flow emerging from the coolant bath is cooled by coolant being sprayed in.

* * * * *